United States Patent
Humelsine et al.

(10) Patent No.: US 6,221,488 B1
(45) Date of Patent: Apr. 24, 2001

(54) MODIFIED POLYESTER WITH HIGH INTRINSIC VISCOSITY AT MODERATE STRENGTH

(75) Inventors: Billy Mack Humelsine, Mooresville; Carl S. Nichols, Waxhaw, both of NC (US)

(73) Assignee: Wellman, Inc., Shrewsbury, NJ (US)

( * ) Notice: Subject to any disclaimer, the term of this patent is extended or adjusted under 35 U.S.C. 154(b) by 0 days.

(21) Appl. No.: 09/626,363

(22) Filed: Jul. 27, 2000

Related U.S. Application Data

(62) Division of application No. 08/949,666, filed on Oct. 14, 1997, now Pat. No. 6,110,587.

(51) Int. Cl.[7] .............................. D02G 3/00; C08F 20/00

(52) U.S. Cl. ...................... 428/365; 528/272; 528/308.6; 528/308.7; 525/437; 428/359; 428/364; 428/370; 428/409; 428/480; 264/176.1; 264/177.13; 264/177.17; 264/DIG. 26

(58) Field of Search .................. 528/272, 308.6, 528/308.7; 525/437; 428/359, 364, 365, 370, 409, 480; 264/176.1, 177.13, 177.17, DIG. 26

(56) References Cited

U.S. PATENT DOCUMENTS

| | | |
|---|---|---|
| 2,897,042 | 7/1959 | Heiks . |
| 2,999,296 | 9/1961 | Breen et al. . |
| 3,391,123 | 7/1968 | Steadly . |
| 3,403,433 | 10/1968 | Schoeneberg . |
| 3,494,819 | 2/1970 | McAlister, Jr. . |
| 3,576,773 | 4/1971 | Vaginay . |
| 3,953,405 | 4/1976 | Feinauer et al. . |
| 4,002,427 | 1/1977 | Moller et al. . |
| 4,092,299 | 5/1978 | MacLean et al. . |
| 4,113,704 | 9/1978 | MacLean et al. . |
| 4,161,579 | 7/1979 | Edelman et al. . |
| 4,215,992 | 8/1980 | Sato et al. . |
| 4,270,913 | 6/1981 | Tse . |
| 4,593,077 | 6/1986 | Borman et al. . |
| 4,666,454 | 5/1987 | DeMartino et al. . |
| 5,039,780 | 8/1991 | Hashimoto et al. . |
| 5,041,357 | 8/1991 | Gersdorf et al. . |
| 5,091,504 | 2/1992 | Blaeser et al. . |
| 5,135,697 | 8/1992 | Roderiquez et al. . |
| 5,145,941 | 9/1992 | Munday et al. . |
| 5,151,494 | 9/1992 | Munday et al. . |
| 5,180,793 | 1/1993 | Vigneault et al. . |
| 5,235,027 | 8/1993 | Thiele et al. . |

(List continued on next page.)

FOREIGN PATENT DOCUMENTS

| | | |
|---|---|---|
| 901716 | 5/1972 | (CA) . |
| 0494113 | 7/1992 | (EP) . |
| 0604973 | 7/1994 | (EP) . |
| 0640638 | 3/1995 | (EP) . |
| 0640638 | 6/1995 | (EP) . |
| 0604973 | 2/1997 | (EP) . |
| 49-086628 | 8/1974 | (JP) . |

OTHER PUBLICATIONS

Nalankilli, G., "Polyester Compositions for the Production of Low Pilling Fibres: Part II," Man–Made Textiles in India, Oct. 1996, pp. 353–359.

Primary Examiner—Samuel A. Acquah
(74) Attorney, Agent, or Firm—Philip Summa, P.A.

(57) ABSTRACT

A method is disclosed of producing a blended fabric of polyester and cotton with superior low pilling characteristics. The method comprises polymerizing a melt consisting essentially of terephthalic acid, ethylene glycol and at least about 1300 parts per million of pentaerythritol to an intrinsic viscosity of at least about 0.55 dl/g. The resulting polymer can be spun into filament, textured, cut into staple, spun into yarn, and formed into fabric. The method and resulting polyester also have advantages in the production of polyester bottle resin and the resulting bottles.

23 Claims, 3 Drawing Sheets

U.S. PATENT DOCUMENTS

| | | |
|---|---|---|
| 5,239,045 | 8/1993 | Hirahara et al. . |
| 5,250,333 | 10/1993 | McNeely et al. . |
| 5,268,136 | 12/1993 | Girard et al. . |
| 5,272,246 | 12/1993 | Roderiguez et al. . |
| 5,494,993 | 2/1996 | Freudenberger et al. . |
| 5,591,516 | 1/1997 | Jaco et al. . |

MODIFIED POLYESTER WITH HIGH INTRINSIC VISCOSITY AT MODERATE STRENGTH

CROSS-REFERENCE TO RELATED APPLICATION

This application is a divisional of U.S. application Ser. No. 08/949,666, filed Oct. 14, 1997, now U.S. Pat. No. 6,110,587.

FIELD OF THE INVENTION

The present invention relates to the manufacture of polyethylene terephthalate (polyester) in which the intrinsic viscosity is sufficiently high to avoid processing problems, while the molecular weight is maintained low enough to provide desired properties in the resulting polyester.

BACKGROUND OF THE INVENTION

The present invention relates to the use of polyester fiber in textile fabrics, particularly blended fabrics, but also has application for the use of polyester as a container material for food and beverages.

As is well known to both those of ordinary skill in this art and to many end-users, staple fibers cut from polyester filament are often blended with natural fibers, including cotton fibers, to form blended yarns and fabrics that exhibit desirable properties of both the natural fiber and the synthetic polyester fiber. Blends of polyester and cotton are particularly suitable for such purposes and have found wide acceptance in consumer textile products, particularly clothing.

One of the problems associated with blended polyester and cotton fabrics, however, is the eventual appearance of "pills" on the blended fabric. A pill generally appears as a small ball of material on the surface of a fabric and for most textile products is considered visually and functionally unacceptable. Pills are formed of "a small accumulation of fibers on the surface of a fabric . . . and are usually composed of the same fibers from which the fabric is made." *Dictionary of Fiber and Textile Technology*, Hoechst Celanese Corporation (1990) page 113.

In blended fabrics, however, the pills tend to be almost exclusively formed from the polyester fibers in the blended polyester/cotton yarns. As best understood, the pills appear to be the result of the higher tensile strength of a typical polyester fiber as compared to the cotton fibers with which they are blended (typical cotton has about two-thirds of the tensile strength of typical polyester). The greater strength of the polyester fibers encourages them to work their way out of the yarn structure and then curl up upon themselves to form the pills. The tendency of a blended cotton/polyester fabric to "shed" cotton fibers also contributes to the problem.

It being understood that the greater strength of the polyester filament causes the pilling problem in blended fabrics, the basic attempts at solving the pilling problem have been to adjust the strength of the polyester filaments in some fashion in order to match them more closely to the strength of the cotton or other natural fibers with which they are blended.

In turn, it is generally well understood that the strength of a polyester fiber can be appropriately reduced by reducing the molecular weight of the polyester. To date, this has been accomplished by shortening the polymerization reaction times for the polyester. Reducing the reaction time and molecular weight, however, also tends to reduce the melt viscosity (and the related intrinsic viscosity, "I.V.") of the polymer, because under normal circumstances melt and intrinsic viscosity are directly proportional to the polymer average molecular weight. As known to those in this art, the melt viscosity is "the resistance of molten polymer to shear deformation," and is related to both intrinsic viscosity and temperature, *Dictionary of Fiber and Textile Technology*, Hoechst Celanese Corporation (1990) page 95. Intrinsic viscosity is the "ratio of the specific viscosity of a solution of known concentration to the concentration of a solute extrapolated to zero concentration, *Dictionary of Fiber and Textile Technology*, supra page 82.

Alternatively, branching agents such as pentaerythritol have been added in an attempt to reduce the strength of the polymer. In typical formulations, about 1000 ppm of pentaerythritol are added to produce a polyester with an I.V. of between about 0.45 and 0.5 dl/g. Although filament formed from this product exhibits lower tensile strength (and thus less pilling), its lower I.V. (and related lower melt viscosity) causes it to tend to run badly in a normal extrusion process. In particular, polymers in the melt phase immediately proceeding the step of spinning the melt polymer into filament, must have a certain intrinsic viscosity in order to undergo the various subsequent steps of filament manufacturer and finishing. If the melt phase has a relatively low melt viscosity (and low intrinsic viscosity), the filaments tend to break more easily during the manufacturing process. In turn, filament breakage causes severe productivity problems in the overall manufacturing scheme. Stated differently, the equipment used to produce polyester filament is designed to handle polyester with a certain I.V.; typically about 0.55 dl/g or greater. Attempting to use a lower I.V. material in the same machinery tends to result in a high level of process interruptions, typically spinning breaks and difficulty in pack wiping.

As noted above, attempts to solve the pilling problem have included adding other materials to the polyester to increase its viscosity at lower molecular weights. Such additives, however, often have cross-linking characteristics that tend to reduce the thermoplastic characteristics of polyester and instead increase its thermosetting characteristics. As understood by those familiar with polymers and their properties, a thermoplastic polymer can be melted and resolidified without changing its composition or structure. A thermosetting polymer, however, does not exhibit such change-of-state characteristics and degrades under the application of heat instead of melting. Such thermosetting properties (such as increased strength) are valuable for certain plastics in certain circumstances. Nevertheless, thermoplastic properties are one of the more desirable characteristics of polyester, and reducing those properties is generally considered undesirable under most circumstances.

Because pentaerythritol is a recognized branching agent, it has been typically added in amounts of about 1,000 ppm although some techniques have used much more (e.g., U.S. Pat. No. 3,576,773). Conventionally, adding more pentaerythritol has been considered to raise the thermosetting properties of the polyester to an undesirable extent. In spite of the disclosures in the '773 patent, however, the market still lacks satisfactory low pill polyester staple or staple blends:

"Thus despite substantial effort and research, fully satisfactory polyester fabrics suitable for bedding and the like which are resistant to the formation of pills and capable of withstanding numerous launderings at institutional or industrial temperature and pH levels are still not available."
U.S. Pat. No. 5,591,516; issued Jan. 7, 1997 at Column 2 lines 20–24.

Therefore, the need exists for a polymerization method and resulting polyester for which the strength characteristics can be more appropriately matched to those of natural fibers to thus enhance the blended characteristics of the resulting yarns and fabrics, and yet which can be manufactured without the disadvantages that to date are exhibited by such lower strength polyester materials.

OBJECT AND SUMMARY OF THE INVENTION

Therefore it is an object of the invention to provide a polyester in which the strength characteristics can be matched as desired but without the disadvantages exhibited by polyester filaments with lower intrinsic viscosity.

The invention meets this object with a method of producing a polyester filament with a molecular weight that is low enough to prevent pilling of fabrics made from the filament, but has an intrinsic viscosity that is high enough to avoid process interruptions during filament spinning. In another aspect, the invention comprises a method of producing a blended fabric of polyester and cotton with superior low pilling characteristics.

In another aspect, the invention is a polymer formed from a melt consisting essentially of polyethylene terephthalate, ethylene glycol and at least about 1300 ppm of pentaerythritol with an intrinsic viscosity of at least about 0.55 dl/g.

In another aspect, the invention is a method of producing a polyester bottle resin while reducing the undesirable production of acetaldehyde as a byproduct.

In another aspect, the invention comprises a resin that contains a reduced amount of acetaldehyde and that is thus particularly suitable for beverage bottles.

In yet another aspect, the invention comprises a blended yarn of cotton fibers and polyester staple fibers that produce fibers and garments with low pilling characteristics.

These and other objects of the invention will become more clear upon consideration of the following detailed description taken in conjunction with the drawings which illustrate preferred and exemplary embodiments and wherein:

DETAILED DESCRIPTION

Figure 1:
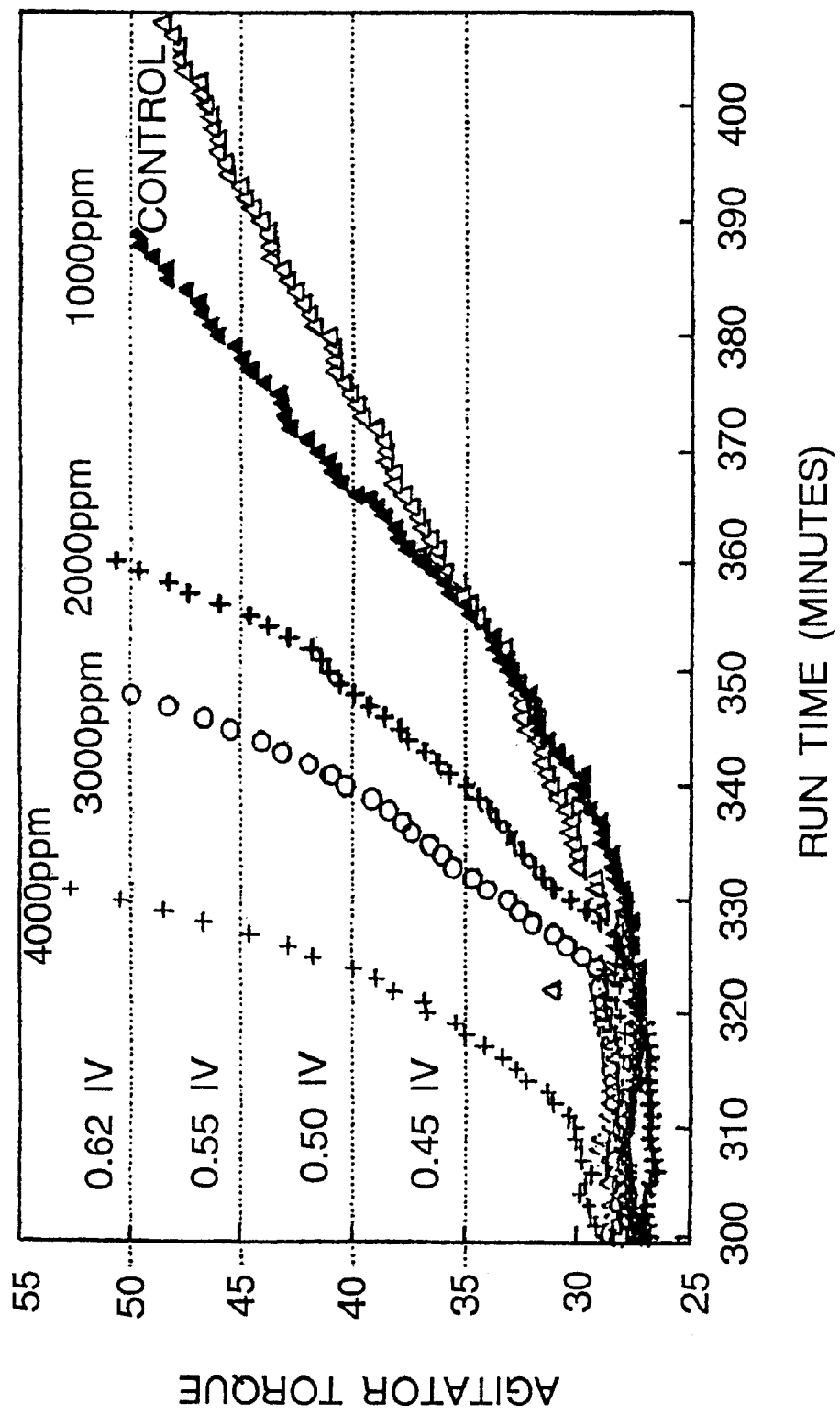
FIG. 1 is a plot of agitator torque versus run time for the polymerization of various compositions of polyester according to the present invention.

The present invention is a method of producing polyester filament with a molecular weight that is low enough to prevent pilling of fabrics made from the filament, but that has an intrinsic viscosity that is high enough to avoid process interruptions during filament spinning. In a broader sense, the method comprises polymerizing a melt consisting essentially of terephthalic acid, ethylene glycol and at least about 1300 parts per million of pentaerythritol to an intrinsic viscosity of at least about 0.55 dl/g; and thereafter spinning the melt into filament.

The term "polyester" is used herein in its conventional sense; i.e., the polycondensation product of a dicarboxylic acid and a dihydroxy alcohol, of which polyethylene terephthalate (from terephthalic acid and ethylene glycol) is the most common example.

The term "intrinsic viscosity" is used herein in its usual sense (e.g., *Dictionary of Fiber & Textile Technology*, supra, at page 82) and corresponds to relative viscosity measurements made in a solution of the polyester of known concentration in a selected solvent. There are a number of related techniques used to determine I.V. For the I.V. values given herein, the I.V. is determined by dissolving the polymer in orthochlorophenol ("OCP"), measuring the relative viscosity (R.V.) of the solution using a Schott Autoviscometer (AVS Schott and AVS 500 Viscosystem), and then calculating the I.V. based on the R.V. (e.g., *Dictionary of Fiber and Textile Technology*, supra, at page 82). In particular, a 0.6 gram sample (+/−0.005g) of dried polymer sample (fiber and yarn samples are typically cut into small pieces; chip samples are ground) is dissolved in about 50 ml (61.0–63.5 grams) of OCP at a temperature of about 105° C. After cooling to room temperature, the solution is placed in the viscometer in which the relative viscosity is measured, and from which the intrinsic viscosity is calculated.

As noted in the Field and Background portions of the specification, a conventional technique for producing low pill fibers has been to add a branching agent such as pentaerythritol to specifically reduce the strength of polyester to make it more equivalent to the strength of typical cotton fiber. In contrast, and in accordance with the present invention it has now been discovered that the mechanization for the action of pentaerythritol in polyester is different that what has conventionally been understood. In particular, the rate of antimony catalyzed polycondensation in a low viscosity polymer or monomer is the same for polyesters that are modified with pentaerythritol as they are for unmodified polyesters. As a result, the molecular weight of the polymer can be directly correlated with the polymerization time. As used herein, the term "molecular weight" refers to number-average molecular weight, rather than weight-average molecular weight.

Accordingly, it has now been discovered in accordance with the present invention that when pentaerythritol is added to polyester, the substantially shorter polymerization times indicate a lower polymer molecular weight rather than a higher molecular weight as previously thought. Thus, it appears that the higher melt viscosity of the polymer is associated only with the branching.

The fact that pentacrythritol modified polymers have the same relationship between melt viscosity and intrinsic viscosity as unmodified polyesters has led conventional thinking to conclude that pentaerythritol modified polyesters have "normal" molecular weights rather than lower molecular weights.

It is now understood in accordance with the present invention, however, that adding significant amounts of pentaerythritol produces higher intrinsic viscosities at lower molecular weight. Furthermore, and as noted above, a polyester's degree of polymerization is about the same for any given time period. Stated differently, the number of polymerization reactions that take place during any given time period is the same for modified or unmodified polyester.

Figure 2:
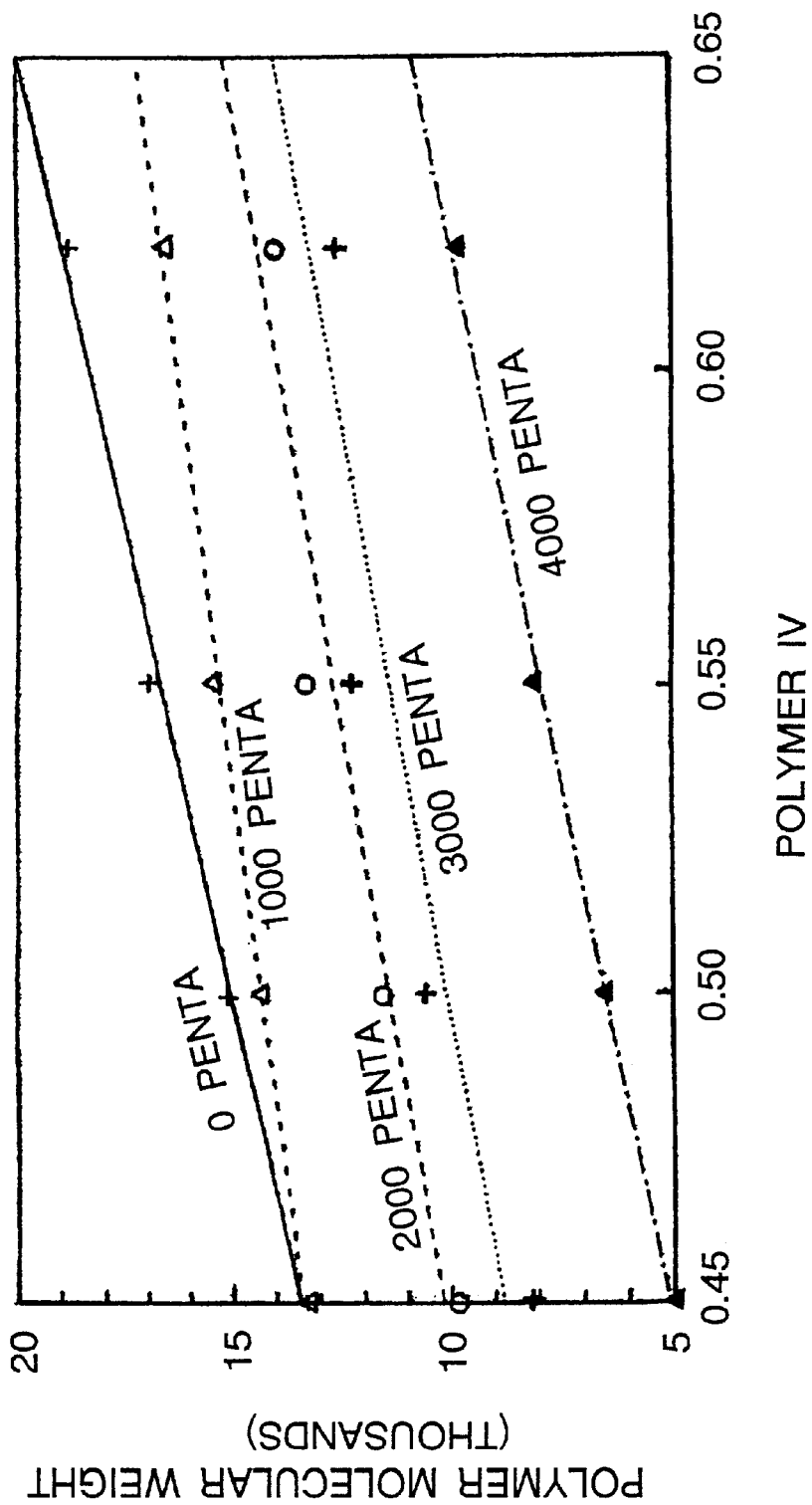
FIG. 2 is a plot of polymer molecular weight versus polymer intrinsic viscosity and demonstrating the possibilities for controlling the polyester intrinsic viscosity and molecular weight based on the use of pentaerythritol.

FIGS. 1 and 2 graphically demonstrate these relationships. FIG. 1 is a plot of agitator torque versus the run time in minutes for a controlled polyester "without pentaerythritol" and for four other polyesters that include respectively 1000, 2000, 3000, and 4000 ppm of pentaerythritol. As well understood by those familiar with polyester polymerization equipment, the agitator torque is directly proportional to the intrinsic viscosity of the polymer so that FIG. 1 includes four horizontal lines that respectively represent selected intrinsic viscosities. In particular, the agitator torque is actually measured as the power required by a DC motor to maintain the agitator at a constant RPM. The numbers plotted in the Figures are thus proportional to the motor amps required to maintain the constant RPM.

As noted above, the degree of polymerization is indicated by the run time rather than by the intrinsic viscosity. Thus, it will be noted that a control (i.e. unmodified) polyester requires approximately 390 minutes (3 and ½ hours) of polymerization to reach an I.V. of 0.55. As pentaerythritol is added, however, the I.V. increases much more quickly. Thus (for example), when 4000 ppm pentaerythritol are added the polyester reaches an I.V. of 0.55 after about 325 minutes of polymerization. The time differential indicates a lower degree of polymerization for the polyester modified with 4000 ppm of pentaerythritol. Because the degree of polymerization is lower, the molecular weight and tensile strength of the resulting polyester filament will be lower, as is desired for low pill applications. Because the intrinsic viscosity is 0.55 dl/g or higher, however, the melt polyester behaves well and generally avoids problems during the manufacturing process.

In this regard, it will be understood that most of the machinery used for polymerization of polyester is designed to work when the polyester being spun into filament has an intrinsic viscosity of about 0.55 dl/g. The equipment, however, does not recognize the degree of polymerization of the melt phase polyester. Therefore, if the I.V. is sufficiently high, the degree of polymerization makes no difference in the manufacturing process.

This understanding permits the information underlying FIG. 1 to be utilized to design low molecular weight, high melt viscosity polymers for spinning polyester filament. Thus, the invention permits the design of a variety of polymers for low pill applications in which particular relationships of melt viscosity and polymer molecular weight can be targeted in order to optimize both the staple manufacturing processes (which is most affected by I.V. or melt viscosity) and customer pilling performance (which is most affected by molecular weight).

FIG. 2 is a plot of polymer molecular weight plotted against polymer intrinsic viscosity using the same underlying data as used to produce FIG. 1 and placed in a forced linear fit relationship. Thus, FIG. 2 illustrates, for example, the different combinations that would be acceptable for producing a polymer of about 12,000 g/mole (which is a good candidate molecular weight for low pill filament). FIG. 2 also demonstrates why current low pill products that incorporate about 1000 ppm of pentaerythritol exhibit such marginal spinning performance.

According to the data developed to date, the relationships between FIGS. 1 and 2 will prevail until the level of pentaerythritol in the polymer reaches more than about 1 mole of pentaerythritol per mole of polymer, at which point substantial crosslinking begins to take place.

Tables 1 and 2 summarizes this data as well.

TABLE 1

Polymerization Characteristics

| Sample | Pentaerythritol (ppm) | Batch Time (Minutes) | Polymerization Time (Minutes) | Final Agitator Torque | Polymer Lab I.V. |
|---|---|---|---|---|---|
| 1 | 0 | 407 | 72 | 48.5 | 0.612 |
| 2 | 1000 | 388 | 49 | 49.5 | 0.600 |
| 3 | 2000 | 360 | 30 | 50.6 | 0.612 |
| 4 | 3000 | 346 | 21 | 49.9 | 0.609 |
| 5 | 4000 | 330 | 22 | 52.7 | 0.640 |

TABLE 2

Polymer Molecular Weights and Moles Pentaerythritol

| pentaerythritol | 0.45 I.V. | | 0.50 I.V | | 0.55 I.V | | 0.62 I.V | |
|---|---|---|---|---|---|---|---|---|
| (ppm) | MW | Moles | MW | Moles | MW | Moles | MW | Moles |
| 0 | 13.3 | 0 | 15.1 | 0 | 16.9 | 0 | 18.8 | 0 |
| 1000 | 13.3 | 0.09 | 14.4 | 0.10 | 15.4 | 0.11 | 16.6 | 0.12 |
| 2000 | 9.8 | 0.14 | 11.6 | 0.17 | 13.3 | 0.19 | 14.0 | 0.21 |
| 3000 | 8.2 | 0.18 | 10.5 | 0.23 | 12.2 | 0.27 | 12.6 | 0.29 |
| 4000 | 5.0 | 0.14 | 6.6 | 0.19 | 8.2 | 0.24 | 9.8 | 0.29 |

(MW=molecular weight of the polyester in thousands)
(Moles=moles pentaerythritol)
(Batch time is defined as the period between turning on the heaters and dropping the batch. Polymerization time is defined as the time in minutes from when the agitator power reaches 30 until the target agitator power is reached).

Figure 3:
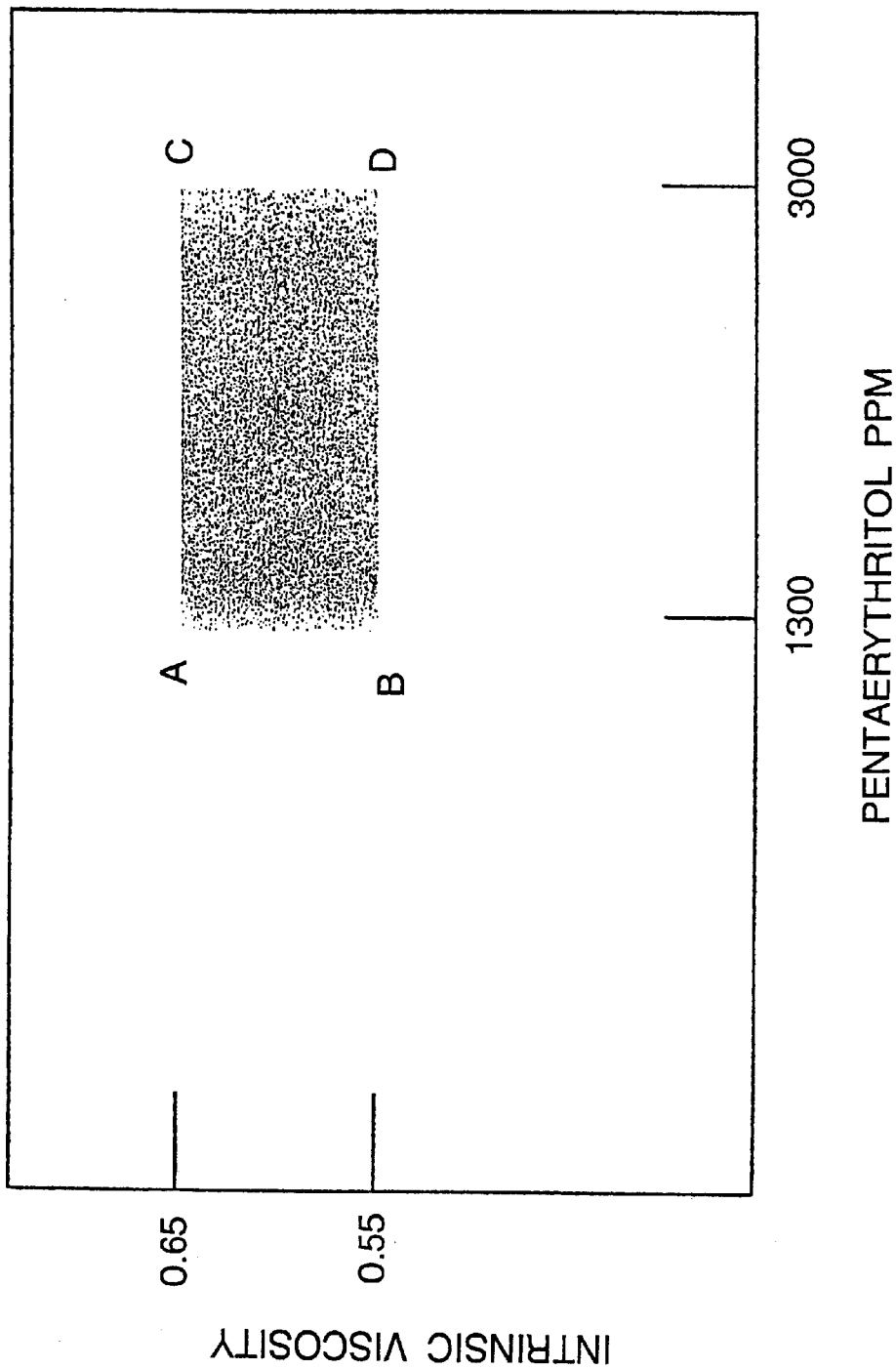
FIG. 3 is a plot of intrinsic viscosity versus parts per million of pentaerythritol and illustrating the preferred embodiments of the invention.

Accordingly, the invention also comprises a method of producing polyester filament wherein the composition and intrinsic viscosity of the polyester are defined by the area ABCD in FIG. 3; i.e., an I.V. of between about 0.55 and 0.65 dl/g and between about 1300 and 3000 ppm of pentaerythritol.

The invention can further comprise texturing the spun filament, cutting the textured filament into staple, spinning the staple into a blended yarn (most frequently with cotton), and forming fabrics and garments from the blended yarn. In preferred embodiments the texturing step can comprise air jet texturing, edge crimp texturing, false twist texturing, gear crimp texturing, knit-de-knit texturing, or stuffer box texturing. It will be understood that the term "texturing" is used herein in its broadest sense and that this art tends to refer to filament as being "crimped" rather than "textured" even though crimping is a form of texturing.

The spinning step can comprise ring spinning, open end spinning or air jet spinning. Each of these techniques is well understood in this art and will not be discussed herein in any further detail.

Once the blended yarns are produced, the resulting fabrics can comprise woven or knitted fabrics as well as garments formed from such woven or knitted fabrics.

Although the present invention has been set forth and described in terms of filaments, yarns, and fabrics, it will be understood by those of ordinary skill in this art that the compositions and techniques described herein can provide advantages in any application or use of polyester in which modifying the melt viscosity, intrinsic viscosity, strength, or molecular weight is desirable or necessary.

In the drawings and specification, there have been disclosed typical preferred embodiments of the invention and, although specific terms have been employed, they have been used in a generic sense only and not for purposes of limitation, the scope of the invention being set forth in the following claims:

That which is claimed is:

1. A method of producing a blended fabric of polyester and cotton with superior low pilling characteristics, the method comprising:

polymerizing a melt consisting essentially of terephthalic acid, ethylene glycol, and at least about 1300 parts per million of pentaerythritol to an intrinsic viscosity of at least about 0.55 dl/g;

spinning the melt into filament;

texturing the spun filament;

cutting the textured filament into staple;

spinning a blend of the polyester staple and cotton into yarn; and forming a fabric from the blended yarn.

2. A method according to claim 1 and further comprising limiting the number-average molecular weight of the polymerization melt to no more than about 13,300 g/mole.

3. A method according to claim 2 comprising limiting the number-average molecular weight to no more than about 12,000 g/mole.

4. A method according to claim 1, wherein the melt consists essentially of polyethylene terephthalate, ethylene glycol, and between about 1300 and 3000 ppm of pentaerythritol, and has an intrinsic viscosity of between about 0.55 and 0.65 dl/g.

5. A method of producing a fabric according to claim 1, wherein the step of forming the fabric comprises weaving the blended yarn.

6. A method of producing a fabric according to claim 1, wherein the step of forming the fabric comprising knitting the blended yarn.

7. A method of producing a fabric according to claim 1, wherein the composition and intrinsic viscosity of the polyester are defined by the area ABCD in FIG. 3.

8. A method of producing a fabric according to claim 1, wherein the step of spinning the blend into yarn is selected from the group consisting of ring spinning, open end spinning, and air jet spinning.

9. A method of producing a fabric according to claim 1, wherein the step of texturing the filament is selected from the group consisting of air jet texturing, edge crimp texturing, false twist texturing, gear crimp texturing, knit-de-knit texturing, and stuffer box texturing.

10. A method of producing polyester filament with a molecular weight that is low enough to prevent pilling of fabrics made from the filament, but that has an intrinsic viscosity that is high enough to avoid process interruptions during filament spinning, the method comprising:

polymerizing a melt consisting essentially of terephthalic acid, ethylene glycol, and at least about 1300 parts per million of pentaerythritol to an intrinsic viscosity of at least about 0.55 dl/g; and spinning the melt into filament.

11. A method according to claim 10 and further comprising limiting the number-average molecular weight of the polymerization melt to no more than about 13,300 g/mole.

12. A method according to claim 11 comprising limiting the number-average molecular weight to no more than about 12,000 g/mole.

13. A method according to claim 10, wherein the melt consists essentially of polyethylene terephthalate, ethylene glycol, and between about 1300 and 3000 ppm of pentaerythritol, and has an intrinsic viscosity of between about 0.55 and 0.65 dl/g.

14. A method of producing polyester filament according to claim 10, wherein the composition and intrinsic viscosity of the polyester are defined by the area ABCD in FIG. 3.

15. A method of producing polyester filament according to claim 10 and further comprising texturing the resulting filament.

16. A method of producing polyester filament according to claim 15, wherein the step of texturing the filament is selected from the group consisting of air jet texturing, edge crimp texturing, false twist texturing, gear crimp texturing, knit-de-knit texturing, and stuffer box texturing.

17. A method of producing filament according to claim 15 and further comprising the steps of cutting the textured filament into staple fiber and spinning the staple fiber into yarn.

18. A method of producing filament according to claim 17, wherein the step of spinning the staple into yarn is selected from the group consisting of ring spinning, open end spinning, and air jet spinning.

19. A method of producing filament according to claim 17 and further comprising blending the staple filament with cotton fibers prior to the step of spinning the staple fibers into yarn.

20. A polymer consisting essentially of polyethylene terephthalate and at least about 1300 ppm by weight of pentaerythritol based on the polyethylene terephthalate; and said polymer having an intrinsic viscosity of at least about 0.55 dl/g.

21. A polymer according to claim 20 having a number-average molecular weight of 13,300 g/mole or less.

22. A polymer according to claim 21 having a number-average molecular weight of no more than about 12,000 g/mole.

23. A polymer according to claim 20 having a composition and intrinsic viscosity defined by the area ABCD in FIG. 3.

* * * * *